(12) United States Patent
Corrigan

(10) Patent No.: US 6,776,998 B1
(45) Date of Patent: Aug. 17, 2004

(54) BIOCIDAL PACKAGING SYSTEM

(75) Inventor: Penny Corrigan, Normanby Road Clayton Victoria (AU)

(73) Assignee: Commonwealth Scientific and Industrial Research Organisation (AU)

( * ) Notice: Subject to any disclaimer, the term of this patent is extended or adjusted under 35 U.S.C. 154(b) by 0 days.

(21) Appl. No.: 09/743,479

(22) PCT Filed: Jul. 13, 1999

(86) PCT No.: PCT/AU99/00564

§ 371 (c)(1),
(2), (4) Date: Jan. 10, 2001

(87) PCT Pub. No.: WO00/03930

PCT Pub. Date: Jan. 27, 2000

(30) Foreign Application Priority Data

Jul. 14, 1998 (AU) .............................................. PP4637

(51) Int. Cl.[7] .......................... A61F 13/00; A01N 25/34
(52) U.S. Cl. ...................................... 424/443; 424/402
(58) Field of Search ................................ 424/443, 402, 424/449

(56) References Cited

U.S. PATENT DOCUMENTS

| | | | | | |
|---|---|---|---|---|---|
| 4,041,209 A | * | 8/1977 | Scholle | ........................ | 428/500 |
| 5,306,745 A | * | 4/1994 | Herran et al. | ................ | 523/205 |

FOREIGN PATENT DOCUMENTS

| | | | |
|---|---|---|---|
| EP | 832 916 A2 | * | 4/1998 |
| EP | 0 832 916 | | 4/1998 |
| FR | 2467795 | * | 4/1981 |
| JP | 5-92533 | | 4/1993 |
| WO | WO 95/06670 | * | 3/1995 |
| WO | WO 98/14073 | * | 4/1998 |

* cited by examiner

*Primary Examiner*—Thurman K. Page
*Assistant Examiner*—Isis Ghali
(74) *Attorney, Agent, or Firm*—Connolly Bove Lodge & Hutz LLP

(57) ABSTRACT

A film of a polymer blend containing at least one polymer having a substantially different water transmission rate to at least one other polymer in the blend. There is dispered through the polymer blend an antifungal agent activated by the presence of moisture.

5 Claims, 4 Drawing Sheets

BIOCIDAL PACKAGING SYSTEM

FIELD OF THE INVENTION

This invention relates to improvements in retarding unwanted biological growth in food packaging particularly in retarding fungal or mould growth in packaged fruit especially table grapes.

BACKGROUND TO THE INVENTION

Where table grapes are stored for prolonged periods or where they are transported over long distances, the continued or repeated application of a fungicide to slow the growth of Botrytis mould is required.

Australian patent 565243 disclosed incorporating a fungicide in a packaging film of polyethylene and heating the film to release the fungicide. Australian patent 646013 discloses a wrapping film for use in retarding fungal decay of citrus fruits which incorporates a fungicide in a first resin layer of a high melt temperature [170–240° C.] and then blending it with a second resin of lower melt temperature. This ensures that the fungicide is released slowly.

In Australia the current method of control is to package table grapes in a waxed corrugated cardboard box having an inner plastic liner bag. A sulphur dioxide releasing pad or sachet is placed inside the package. Such a system is disclosed in U.S. Pat. No 3,559,562. Although this has given satisfactory results there are a number of disadvantages. The rate of release of sulfur dioxide is not well controlled especially if there are temperature fluctuations during storage. High levels of Sulfur dioxide cause bleaching of the grapes with the consequence that their sale price is lowered. Further, high residue levels of sulfite in the grapes can cause health problems for a proportion of the population. Another difficulty with the present method is the localized release of sulfur dioxide within the package resulting in considerable variation of sulfur dioxide concentration.

It is an object of this invention to provide a means of releasing sulfur dioxide at a constant or zero order rate so that a minimally effective dosage rate can be achieved to reduce the disadvantages of using sulfur dioxide.

BRIEF DESCRIPTION OF THE INVENTION

To this end the present invention provides a block, pad or film of a polymer blend which contains at least one polymer having a substantially different water transmission rate to at least one other polymer in the blend and there being dispersed through the polymer blend an antifungal agent activated by the presence of moisture.

This invention is predicated on the discovery that the release rate of water activated fungicides such as sodium metabisulfite can be controlled by controlling the proportions of polymers having high and low water transmission rates. This invention is predicated on the realisation that there are two polymer properties which affect the release rate of sulfur dioxide, the rate at which water particularly water vapour penetrates the polymer to contact the bisulfite and the rate of transmission of the sulfur dioxide through the polymer. This discovery means that slow release preparations can now be provided that have a lower release of sulfur dioxide without being below the concentration which inhibits fungal growth. The release rate can also be adjusted to suit the rate required by different fruit varieties. The property of the polymers most useful in determining the blend components is the water vapour transmission rate [WVTR].

Where the water activated fungicide is sodium metabisulfite the polymer blend preferably is processable at temperatures below 150° C. which is the decomposition temperature of the sodium metabisulfite. Potassium metabisulfite as the fungicide allows processing temperatures below 190° C. to be used but it has a slower release rate and a lower overall conversion per mole.

The polymer blend is preferably an olefine polymer with a polymer containing hydrophilic groups. The ratio of hydrophobic to hydrophilic polymer can be determined by simple trials. Preferably the polymer blend includes an ethylene/vinyl acetate copolymer (EVA) as the polymer with high release rate and a linear low density polyethylene (LLDPE) as the polymer with a low water release rate. A blend of these two polymers EVA/LLDPE within the range of 30:70 to 80:20 is usually effective. Preferred blends contain equal amounts of EVA and LLDPE or 70% EVA and 30% LLDPE.

The fungicide can be any active fungicide that allows the active agent to migrate through the polymer in a sustained manner. Water activated fungicides are preferred for the polymer blend of this invention. Sulfur dioxide generating agents are preferred and in particular bisulfite compounds the most preferred being sodium metabisulfite. The metabisulfite is in finely divided form, but there is no criticality to the particle size of the compound. The amount of the metabisulfite in the polymer blend must be sufficient to maintain a sustained release of sulfur dioxide over a period of up to 8 weeks. Usually a content of 10% to 30% by weight has been found to be adequate.

The metabisulfite can be mixed with one of the polymer components and then blended with the second polymer, This is not critical and the lower processing temperature is the key to selecting the steps in blending. With EVA/LDPE blends it is preferred to form a master batch of metabiswfite with EVA and then blend this with LDPE in the desired ratio to form the film.

The film of this invention can be used as a single film or as one layer in a laminate or coextruded multilayer film. The reason for doing this can be to improve the strength of the film, its printability or to modify the water transmission rates of the film. It is preferred to coextrude the EVA/LDPE blend containing the metabisulfite with LDPE. The LDPE layer provides a better printing surface and becomes the outside layer and decreases the penetration of water vapour from outside of the box.

In another aspect of this invention there is provided a package for transporting and storing fruit preferably table grapes which includes 1. a container;
2. optionally a water absorbent material lining said container;
3. optionally, a plastic liner between the container walls and said absorbent material;
4. disposed adjacent the fruit a film pad or block of a polymer blend containing a moisture activated antifungal agent wherein the polymer includes at least one polymer having a water transmission rate substantially different to that of at least one other polymer of said blend.

It has been found that the presence of a water absorbent material such as corrugated paper wadding appears to stabilize the release rate of sulfur dioxide presumably by reducing the humidity levels in the container. Some wadding materials may also act as a sink for sulfur dioxide.

DETAILED DESCRIPTION OF THE INVENTION

EXAMPLE 1

Figure 1:
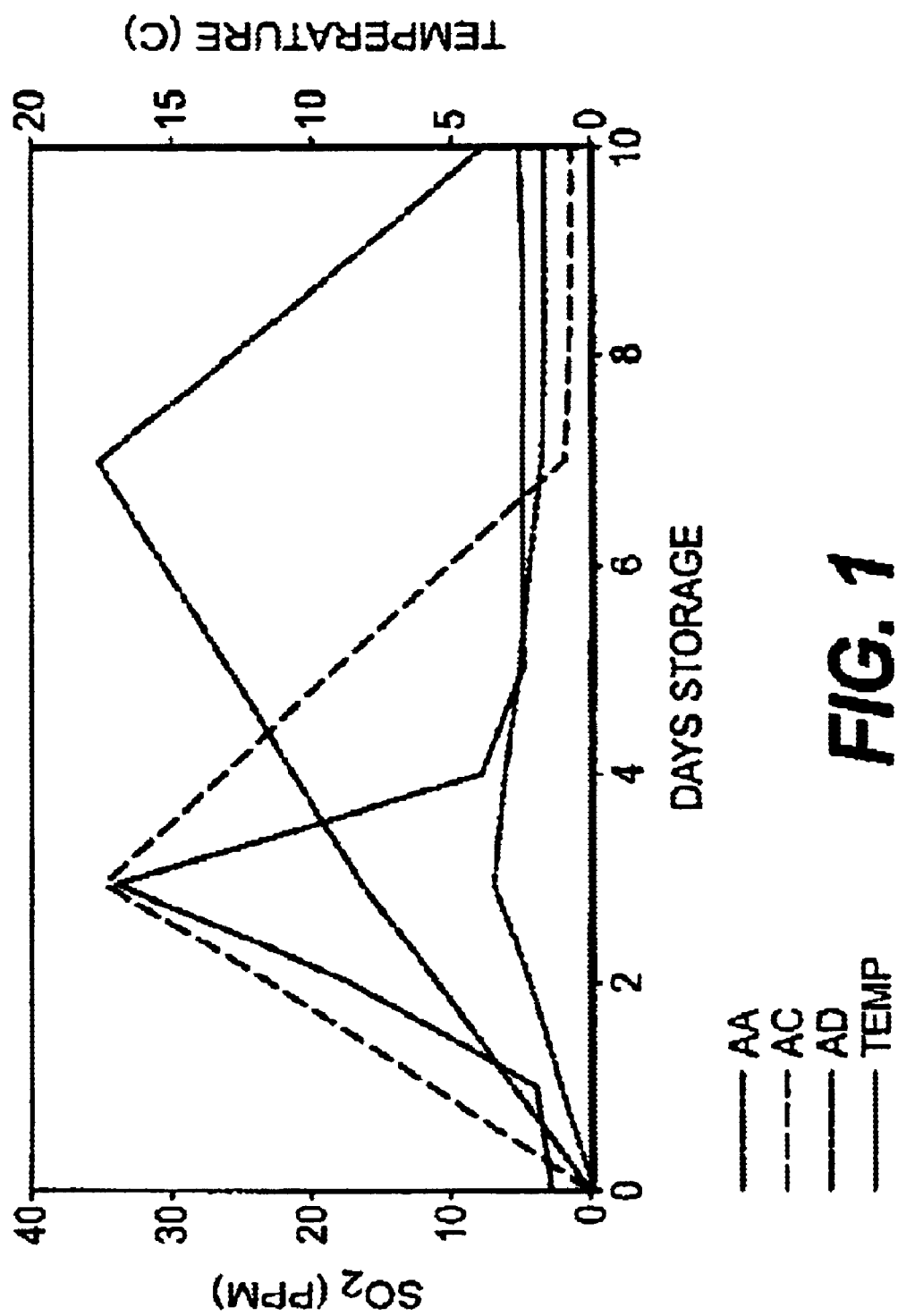
FIG. 1 is a plot of $SO_2$ levels of packaged grapes during simulated air freight storage.

Polymer blends of 30% Low density polyefiylen (LDPE) with 70% of a copolymer of ethylene and vinyl acetate (EVA) (liner 1) and 50% LDPE with 50% EVA, (liner 2) each containing 15% sodium metabisulfite, were formed into film and converted to liner bags for grape boxes.

These were then tested as box liners in a field trial using Thompson seedless grapes. Grapes picked the previous day and stored in the cool room were packed in boxes with conventional high density polyethylene liners [HDPE] and the liners of this invention. All boxes were returned open to the coolroom and left till the grapes reached <2° C. Bags were then closed and the lids added with addition of $SO_2$ pads to the conventionally lined boxes and corrugated wadding as required. The 54 boxes were loaded onto a pallet and trucked overnight. On arrival they were split into sub-trials and subjected to two different storage regimes
1. a temperature profile simulating air freight from Melbourne to an Asian destination
2. a temperature profile simulating sea freight from Melbourne to an Asian destination

Air Freight Simulation

The treatments in this subtrial were

AA PE liner with $SO_2$ pad [Oskuvid] plus corrugated wadding

AB PE liner with corrugated wadding

AC liner 1 with corrugated wadding

AD liner 2 with corrugated wadding

Each treatment had six replicates [24 boxes in all]

On arriving from the overnight trucking the boxes were placed in a holding bay and left at ambient temperatures for two days. The temperature in the boxes reached about 17° C. the boxes were then placed in a coolroom at 2–3° C. for 10 days. $SO_2$ levels in half the boxes were measured several times during storage including when at the high temperature [see FIG. 1]. The higher temperatures increased the $SO_2$ release rates from liners 1 and 2 and more so from 1 [AC] than 2 [AD]. The release rates dropped rapidly with temperature when returned to the cool room. In contrast the $SO_2$ pad AA showed a marked increase in $SO_2$ levels after return to the cool room due to condensation inside the pads [see FIG. 1].

At the end of the storage period the grapes were removed, weighed and three bunches from each box taken for assessment for rot and stem condition. These bunches were from the top center, top corner and bottom corner positions in the box. After a further three days storage at 21° C. these bunches were again assessed for rot bleach and stem condition.

Ex-store Assessment

TABLE 1

Quality assessment parameters on removal from cold storage

| treatment | % rot | Stem condition | Average weight of grapes [kg] |
|---|---|---|---|
| AA | 0 | 1.4 | 10.12 |
| AB | 0 | 2.6 | 10.11 |
| AC | 0 | 1.6 | 10.06 |
| AD | 0 | 1.7 | 9.88 |

The weights measured indicate that liner 2 may not be a sufficient water barrier although the stem condition is not significantly different from the other treatments.

Ex-marketing Assessment

TABLE 2

Quality assessment after 3 days at 20° C.

| Treatment | % bleach [berries] | % rot | Stem condition | $SO_2$ exposure [ppm.days] |
|---|---|---|---|---|
| AA | 5.9 | 0 | 2.1 | 218 |
| AB | 0 | 2.8 | 4.3 | 0 |
| AC | 9.3 | 0.1 | 3.8 | 136 |
| AD | 10.0 | 0.1 | 4.4 | 23 |
| LSD [p < 0.05] | 5.0 | | 0.8 | |

Bleach in the bunches taken from different positions in the box were also analysed.

TABLE 3

Bleach levels at different box positions

| Position | AA | AC | AD |
|---|---|---|---|
| Top centre | 8.8 | 9.9 | 9.4 |
| Top corner | 4.8 | 8.5 | 9.8 |
| Bottom corner | 4.0 | 9.5 | 10.8 |

LSD [p < 0.05] = 6.1

All the $SO_2$ treatments were successful in preventing the growth of rots, however despite the measured differences in $SO_2$ levels delivered in the different treatments, there was no statistical difference in the total amount of of bleach observed. Liners 1 and 2 both delivered $SO_2$ in a more even manner throughout the box as no positional differences were observed. In contrast the oskuvid pad [AA] caused greater bleaching in the top center than in the bottom bunch. Previous trials have shown that pads show a distinct gradient with high levels at the top near the pad and low levels at the bottom of the box.

Sea Freight Temperature Simulation

Treatments in this sub trial were

SA PE liner with $SO_2$ pad [Oskuvid] plus corrugated wadding

SB PE liner with corrugated wadding

SC liner1 with corrugated wadding

SD liner 2 with corrugated wadding

SE liner 1 with no added wadding

On arriving in Melbourne after the overnight trucking these boxes were placed in a coolroom at 5° C. for two days, then moved to a coolroom at 2–3° C. for 4 weeks.

Figure 2:
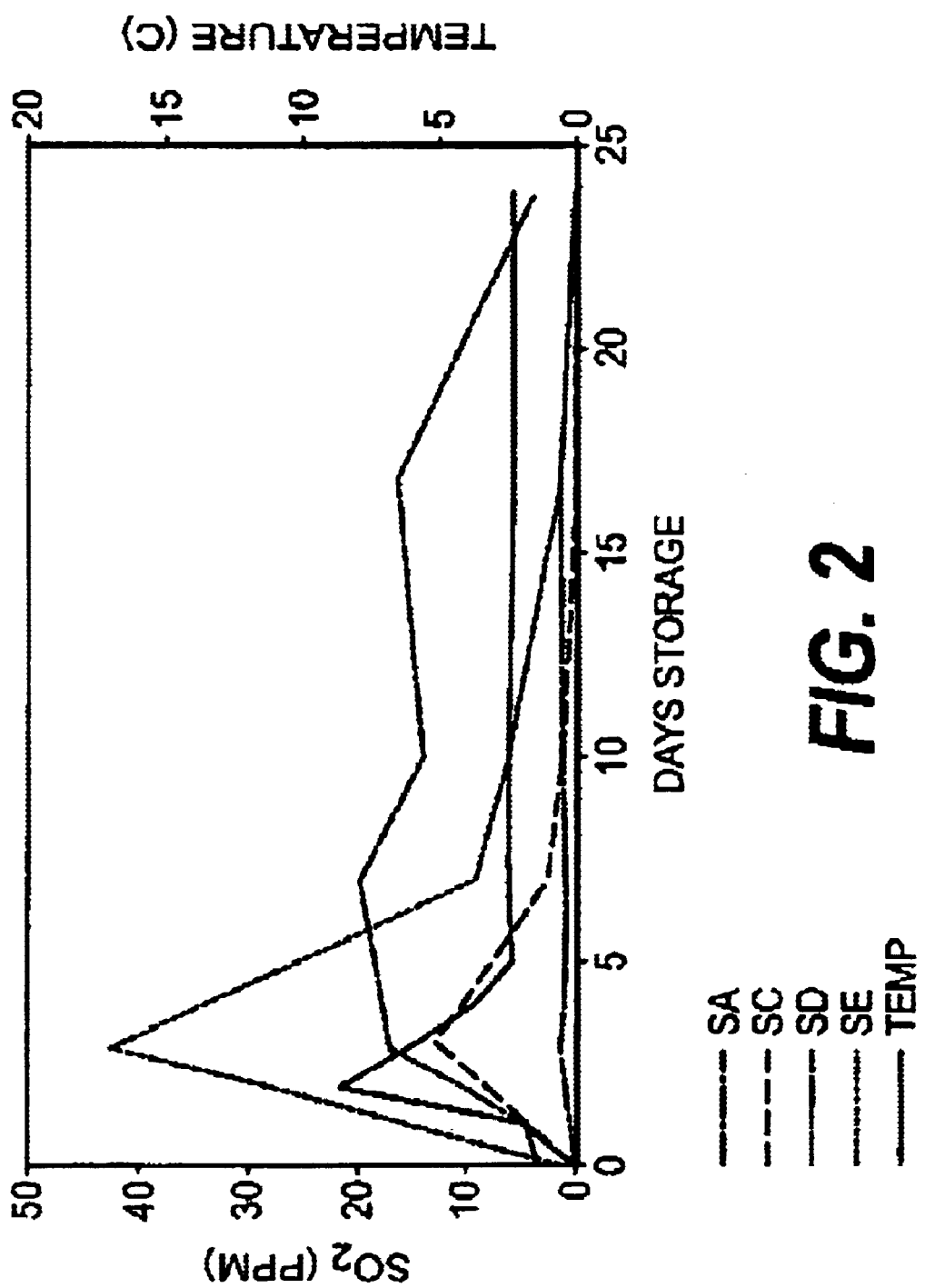
FIG. 2 is a plot of $SO_2$ levels of packaged grapes during simulated ship freight storage.

$SO_2$ levels in half the boxes were measured several times during storage. These are shown in FIG. 2.

From the graph comparing SC with SE it is clear that the wadding has a large effect on $SO_2$ levels in the packaging. This may be due to absorption of sulfur dioxide by the wadding and/or to the wadding modifying humidity levels.

At the end of the storage period grapes were removed and four bunches were taken from four different positions in each box for assessment of rot and stem condition. After a further 3 days storage at 21° C., these bunches were again assessed for rot, bleach and stem condition. A more detailed bleach assessment was also undertaken to assess severity of bleach as well as the % of bleached grapes [by weight]. For each bunch the bleached grapes were separated into three groups representing severity of bleach:

1. <10% of grape surface area
2. <25% and >10% of grape surface area
3. >25%% of grape surface area These were then weighed and calculated as a % of the bleached grapes.

Ex-store Assessment

TABLE 4

Quality assessment parameters on removal from cold storage

| treatment | % rot | Stem condition | Average weight of grapes [kg] |
|---|---|---|---|
| SA | 0 | 1.25 | 10.05 |
| SB | 1.84 | 3 | 10.39 |
| SC | 0 | 1.33 | 10.00 |
| SD | 0.16 | 1.54 | 9.92 |
| SE | 0 | 1.71 | 9.97 |

Again liner 2 is showing greater water loss than the conventional treatments. All the treatments with c successfully controlled the growth of Botrytis.

Ex-Marketing Assessment

TABLE 5

Quality assessment after 3 days at 20° C.

| Treatment | % bleach [berries] | Bleach [severity] | % rot | Stem condition | $SO_2$ exposure [ppm.days] |
|---|---|---|---|---|---|
| SA | 22.7 | 0.398 | 0 | 2.3 | 351 |
| SB | 0 | 0 | 12.7 | 4.7 | 0 |
| SC | 16.5 | 0.188 | 0.2 | 3.5 | 67 |
| SD | 8.4 | 0.093 | 0.2 | 3.6 | 25 |
| SE | 39.6 | 0.539 | 0 | 3.5 | 236 |
| LSD [p < 0.05] | 6.3 | 0.82 | | 0.76 | |

The positional effects are shown in table 6

TABLE 6

Bleach severity according to bunch position in box

| | SA | SC | SD | SE |
|---|---|---|---|---|
| Top centre | 0.54 | 0.20 | 0.07 | 0.46 |
| Top corner | 0.41 | 0.14 | 0.10 | 0.57 |

TABLE 6-continued

Bleach severity according to bunch position in box

| | SA | SC | SD | SE |
|---|---|---|---|---|
| Middle | 0.33 | 0.15 | 0.05 | 0.52 |
| Bottom corner | 0.31 | 0.26 | 0.16 | 0.61 |

LSD[p < .05] = 0.16 [for comparing across treatments]
= 0.17 [for comparing within treatments]

The bottom bunches of liner 1 without wadding were the most severely bleached. Liner 2 was the most effective at controlling rot whilst minimising bleaching. It is surprising that bleaching was observed at such low $SO_2$ levels. Temperature may have a significant effect on susceptibility to bleaching since these grapes were not stored at the preferred 0° C.

EXAMPLE 2

In this example bags composed of film containing the polymer blend of this invention were trialled.

The two bags made in accordance with the invention were formed by co-extruding a 20 micron film of LDPE onto a 50 micron film of a 70/30 EVA/LDPE polymer matrix containing sodium metabisulfite.

Bag1 contained 12% sodium metabisulfite

Bag 2 contained 15% sodium metabisulfite

The active layer was on the inside and the LDPE layer on the outside of each bag to reduce water loss from the grapes.

Bags were prepared for 10 kg boxes of Thomson Seedless and Red Globe grapes and boxes were also prepared using a commercially available $SO_2$ releasing pad and control boxes with no $SO_2$ treatment.

The boxes were also seeded with five Botrytis infected berries so that the effectiveness of the $SO_2$ levels could be tested in relation to the inhibition of the spread of infection from these berries.

Two trials were carried in a simulated sea freight temperature profile as follows:

5° C. for 2 days [farm to ship]
2–3° C. for 4 weeks [ship]
20° C. for 3 days [marketing]

The first trial used Thompson Seedless and the second trial used Red Globe grapes.

Thompson Seedless Trial

When the boxes were opened the seeded berries were located and the number of adjacent infected berries were counted and the averages are shown in table 7.

TABLE 7

| treatment | Average count |
|---|---|
| Bag 1 | 0.4 |
| Bag 2 | 0.2 |
| Commercial pad | 0.5 |
| control | 4.6 |

The bags of this invention were just as effective as the commercial pad in preventing spread of infection.

The % rot and stem condition were also evaluated using four bunches of grapes taken from strategic positions in the box. The results upon removal from cold storage [ship] are shown in table 8

TABLE 8

| Treatment | % Rot | Stem Condition |
|---|---|---|
| Bag 1 | 0.08 | 1.88 |
| Bag 2 | 0.15 | 1.83 |
| Commercial pad | 0.11 | 1.92 |
| Control | 5.89 | 2.38 |
| LSD | 2.02 | |

These quality parameters as well as bleaching damage were assessed again after a further 3 days storage at 20° C. [marketing] and the results are shown in table 9

TABLE 9

| Treatment | Total rot | % Bleach | Bleach Severity | Stem Condition |
|---|---|---|---|---|
| Bag 1 | 2.3 | 16.6 | 0.171 | 4.4 |
| Bag 2 | 4.0 | 16.7 | 0.173 | 4.5 |
| Commercial pad | 0.5 | 30.7 | 0.423 | 3.7 |
| Control | 15.4 | na | | |
| LSD | 4.53 | 6.31 | 0.086 | | na = not assessed

The lower levels of $SO_2$ produced in the bags of this invention result in less bleaching and severity of bleaching compared to the commercial sachet which did give a slightly better performance in terms of % rot and stem condition.

Figure 3:
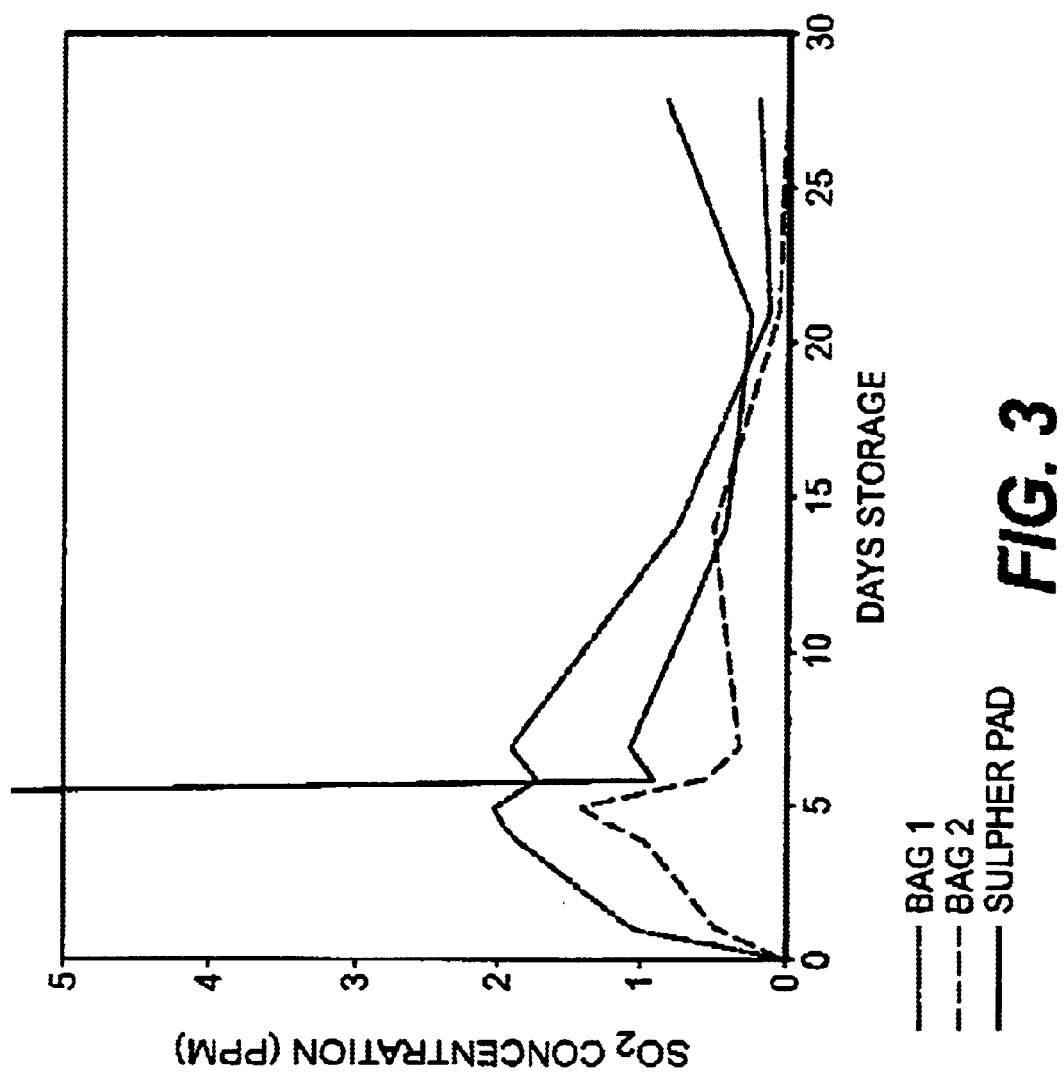
FIG. 3 is a plot of $SO_2$ levels of Thompson Seedless grapes stored in bags according to the invention.

FIG. 3 charts the average $SO_2$ levels over the period of the trial. The levels for the commercial pad peaked at 33 ppm during the first 6 days.

Sulphite residue tests were also carried out. A bunch was removed from near the top of the box and stored at room temperature for 2 days prior to analysis. Three measurements on each of the two inventive bags were made and also on the commercial pad. All measurements from the bags of the invention were 0 but the commercial pad resulted in a reading of 8.64 ppm.

Red Globe Trial

There was little spread of infection in any of the boxes. Quality was assessed on removal from the cool store and are shown in table 10.

TABLE 10

| Treatment | % Rot | Stem Condition |
|---|---|---|
| Bag 1 | 1.39 | 1.58 |
| Bag 2 | 2.63 | 1.92 |
| Commercial pad | 0.52 | 1.75 |
| Control | 17.77 | 1.92 |
| LSD | 6.51 | 0.42 |

These quality parameters as well as bleaching damage were assessed again after a further 3 days storage at 20° C. [marketing] and the results are shown in table 11

TABLE 11

| Treatment | Total rot | % Bleach | Bleach Severity | Stem Condition |
|---|---|---|---|---|
| Bag 1 | 13.25 | 19.9 | 0.23 | 4.25 |
| Bag 2 | 10.01 | 0 | | 3.79 |
| Commercial pad | 0.65 | 34.6 | 0.58 | 2.42 |
| Control | 55.3 | Na | | 4.88 |
| LSD | 10.3 | 18.4 | 0.355 | 0.61 | na = not assessed

Sulphite residue tests were also carried out. A bunch was removed from near the top of the box and stored at room temperature for 2 days prior to analysis. Readings of 12.4 and 8.1 mg/L sulfite were obtained from 2 of the boxes containing commercial pads. All measurements from the bags of the invention were 0.

Figure 4:
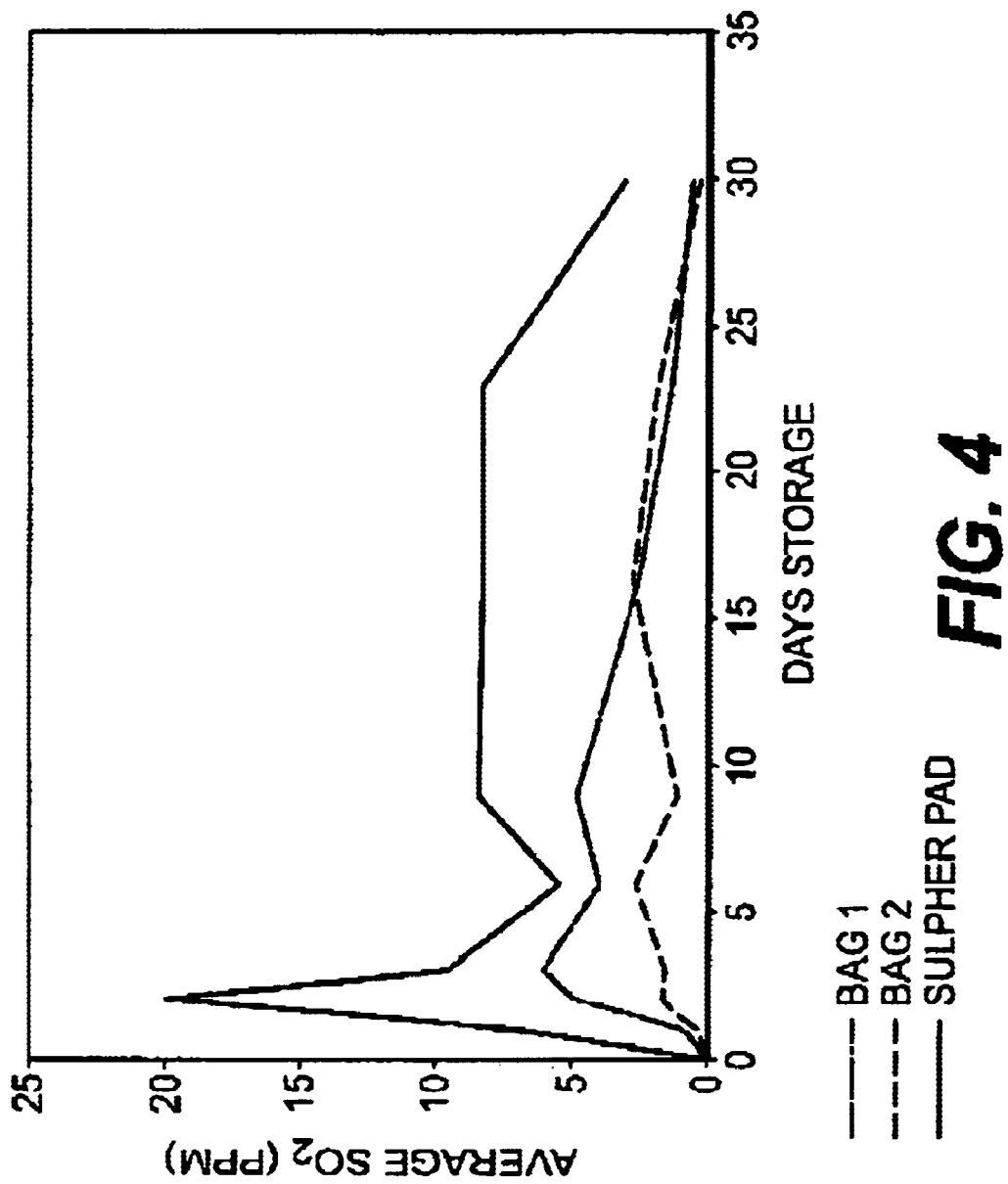
FIG. 4 is a plot of $SO_2$ levels of Red Globe grapes stored in bags according to the invention.

FIG. 4 is a chart of the $SO_2$ levels over the period of the red globe trial. This clearly shows why the bags of the invention result in less damage to the grapes and yet achieve an even release of $SO_2$.

From the above can be seen that the present invention can minimise bleach damage without compromising the retardation of rot.

What is claimed is:

1. A packaging film for retarding fungal and mold growth in packaged fruit, the film having a polymer blend comprising:

at least one EVA copolymer;

at least one low density polyethylene having a different water transmission rate than the at least one EVA copolymer to control the migration of water vapor into the film from the packaged fruit; and an inorganic metabisulfite antifungal agent, wherein the antifungal agent is first blended with the EVA copolymer and then blended with the low density polyethylene, wherein the moisture from the fruit activates the antifungal agent, and wherein the antifungal agent decomposes continuously in response to water vapor from humidity surrounding packaged fruit thereby producing controlled release of fungicidal sulfur dioxide into the fruit that retards the fungal growth.

2. The film set forth in claim 1, wherein a sulfur dioxide transmission rate is above the concentration which inhibits fungal growth but is below 5 ppm.

3. The film set forth in claim 1, wherein a major portion of the blend by weight is the EVA copolymer and a minor portion by weight is the low density polyethylene; and further wherein the antifungal agent is sodium metabisulfite in an effective amount of 10%–30%.

4. The film set forth in claim 1, together with additional layers to form a multi-layer film.

5. The film set forth in claim 1, formed into a bag.

* * * * *